United States Patent Office 3,427,310
Patented Feb. 11, 1969

3,427,310
SENSITIZING METHINE DYES AND INTERMEDIATES, PROCESS FOR PREPARING SAME AND PHOTOGRAPHIC ELEMENT CONTAINING THESE DYES
Bela Gaspar, 240 S. Oakhurst Drive,
Beverly Hills, Calif. 90212
No Drawing. Original application Feb. 9, 1961, Ser. No. 87,989, now Patent No. 3,152,905. Divided and this application Dec. 18, 1963, Ser. No. 335,973
U.S. Cl. 260—240.1                          19 Claims
Int. Cl. C09b 23/02, 23/10

This application is a division of application Ser. No. 87,989 filed Feb. 9, 1961, now U.S. Patent 3,152,905, which in turn is a continuation-in-part of application Ser. No. 504,666, filed Apr. 28, 1955, now abandoned.

This invention relates to methine dyes and to processes for preparing them. A further object is the provision of intermediates for the preparation of my novel dyes. A further object is to use these dyes for color sensitization of photographic emulsions and to prepare such sensitized emulsions, especially color photographic emulsions, containing such dyes. A still further object is the provision of a photographic material containing these dyes.

My invention makes it possible to make a large variety of dyes ranging in color from yellow to blue. These new dyes strongly sensitized the photographic emulsion in various regions of the spectrum, and many of these sensitizers are suitable as selective sensitizers in color photography.

Furthermore, the intermediates and dyes can also be used as filter dyes, antihalation dyes, and for dyeing plastics, fibers, textiles and lacquers, and as intermediates for further synthesis. The invention relates more particularly to a novel group of dyes having the general formula:

(I)
$$A(-L=L)_n-L=C\underset{Q_1}{\overset{O=C-N-R_1}{\diagdown\diagup}}C=(L-L=)_{n_1}B$$

wherein $n$ and $n_1$ are each a positive integer of from 0 to 2, preferably 0, and wherein (Ia)
$$A \text{ is } -\underset{H}{\overset{\diagup Z\diagdown}{C}}-C=O \text{ or } -\underset{(tautomeric\ form)}{\overset{\diagup Z\diagdown}{C}=C-OH} \text{ or } -\overset{J}{\underset{}{C}H}-\overset{Q}{\underset{}{C}}=O \text{ or } \overset{J}{\underset{J}{C}H-}$$

and (Ib)
$$B \text{ is } =C\underset{Z}{\overset{\diagup\diagdown}{\ }}C=O \text{ or } =\overset{J}{C}-\overset{Q}{C}=O \text{ or } \underset{J}{\overset{}{C}-J}$$

where
J represents a member of the group consisting of cyano, carboxyl, and carboxylic acid acyl such as acetyl, propionyl, benzoyl, etc.
Q represents hydroxyl, alkyl, aryl, amino, e.g. anilino, a carbalkoxyl, alkoxyl or heterocyclic, e.g. furane and thiophene, group.
Z represents the non-metallic atoms necessary to complete a 5 or 6 membered heterocyclic nucleus, or to complete a carbocyclic nucleus, e.g., one containing a reactive methylene group. Preferably such heterocyclic nucleus contains a nuclear nitrogen atom and a nuclear sulfur atom or a nuclear oxygen atom, and preferably such carbocyclic nucleus contains a pair of nuclear keto groups. Ilustrative examples were Z is heterocyclic are thiazolidone, oxazolidone, imidazolidone, thionaphthenone, pyrazolone, and pyrimidone nuclei, and illustrated examples when 2 is carbocyclic are indanedione or 5,5 dimethyl 1,3 cyclohexanedione.

(Ic) L represents a methine group, either unsubstituted or substituted, for example, with alkyl or aryl substituents.

(Id) $R_1$ is alkyl, aryl, heterocyclic, acyl or $$N\underset{R_4}{\overset{R_3}{\diagdown}}$$

The alkyl, aryl and heterocyclic groups may be unsubstituted or further substituted, for example, by alkyl, aryl, heterocyclic, hydroxyl, carboxyl, carbalkoxyl, sulfo, ether and the like. $R_3$ is hydrogen, a hydrocarbon, e.g., alkyl or aryl, or $R_3$ is an acyl radical, and $R_4$ is acyl.

(Ie) $Q_1$ is S or $$-\underset{}{\overset{}{N}}-R_2$$

where $R_2$ is hydrogen, alkyl or aryl.

The dyes of the type illustrated by the above general formula can be prepared by several methods. One of the preferred methods is by reacting an intermediate of the formula (IIa)
$$\left[A(-L=L)_n-L=C\underset{Q_1}{\overset{O=C-N-R_1}{\diagdown\diagup}}C=S^+-R\right]X^-$$

or (IIb)
$$\left[R_5(-L=L)_n-L=C\underset{Q_1}{\overset{O=C-N-R_1}{\diagdown\diagup}}C=S^+-R\right]X^-$$

where R is alkyl, X is an anion, such as methosulfate or toulene sulfonate, and $R_5$ is arylamino or acylarylamino, with an organic compound containing a reactive methylene group.

Although I prefer to write the compounds of IIa and IIb as above indicated, these structures can also be represented in their tautomeric forms as follows:

$$\left[A(-L=L)_n-L=C\underset{Q_1}{\overset{O=C-N^+-R_1}{\diagdown\diagup}}C-S-R\right]X^-$$

and $$\left[R_5(-L=L)_n-L=C\underset{Q_1}{\overset{O=C-N^+-R_1}{\diagdown\diagup}}C-S-R\right]X^-$$

The reactive dineculear intermediate IIa can be prepared by quaternating a dinuclear oxonol dye having a single thione group. The mononuclear intermediate IIb can be formed by quaternating the corresponding mononuclear compound, e.g. as described in Example 1-a below.

Organic compounds containing a reactive methylene group which can be used for reaction with compounds IIa or IIb are those having the general formula (IIc) $\quad J-CH_2-J$ (IId) $\quad \underset{CH_2-C=O}{\overset{J\ \ \ \ Q}{}}$ (IIe) $\quad \underset{CH_2-C=O}{\overset{\diagup Z\diagdown}{}}$ (IIf) $\quad \underset{CH_2-C=S}{\overset{\diagup Z\diagdown}{}}$ or (IIg) $\quad \underset{CH_2-C=N-R_1}{\overset{\diagup Z\diagdown}{}}$ where J, Q, Z and $R_1$ have the meanings defined above.
The reaction is carried out generally in a basic medium. When using the intermediate of Formula IIa this material is reacted with one molecule of one of the compounds defined by the Formulae IIc to IIg. When using the intermediate of Formula IIb this material can be reacted either successively or simultaneously with two molecules of a compound defined by the Formulae IIc to IIg. In the latter case, when the above material of Formula IIb is reacted successively with the aforementioned compounds of Formulae IIc to IIg, said compounds may be identical or different, as will be apparent from the examples set forth hereinafter.

When the compound of Formula IIb is reacted with one molecule of a compound defined by Formulae IIc to IIg, under conditions to replace the $=S^+-R_{X_-}$ radical of Formula IIb, the resulting intermediate has the formula (IIh)

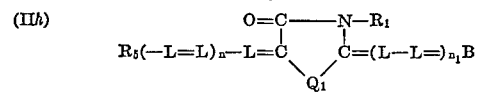

This intermediate compound can then be reacted with another molecule of a compound defined by Formulae IIc to IIg to produce the dye of Formula I above.

The reaction can, however, be carried out in such a way that the compound of Formula IIb reacts in the 5-position and the $=S^+-R_{X_-}$ radical remains intact. The result is the intermediate IIa. This intermediate can be isolated as such, or can be further reacted with compounds of the general Formula IIc to IIg as previously noted, to remove the $S^+-R_{X_-}$ radical, to produce symmetrical or unsymmetrical dyes of Formula I, depending on whether A and B are identical or different.

It has now been found that under certain reaction conditions the reaction of one mol of the starting material IIb with one mol of a compound of the type IIc to IIg, in a solvent in the presence of a base can lead to a mixture of intermediates including IIh and a salt similar to intermediate IIa. This is exemplified by the reaction given below:

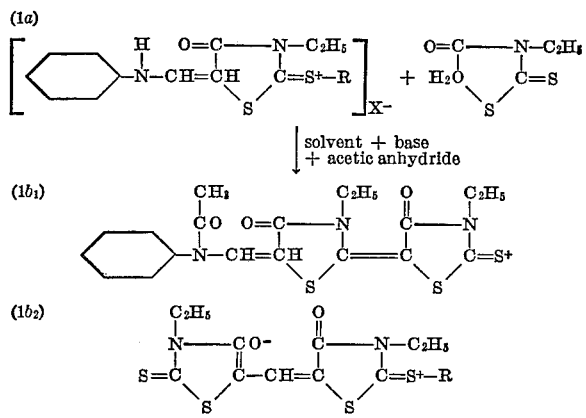

It appears from analytical data that one of the reaction products present in the mixture could be represented as an inner salt as illustrated by Formula 1b₂. However, such salt formation is not limited to formation of an inner salt, but in the presence of other anions, e.g. strong anions, a salt of the type illustrated by Formula IIa can be formed. If desired, the intermediates 1b₁ and 1b₂ can be separated from the reaction mixture by extraction with a non-polar solvent, e.g., benzene. The remaining material comprising intermediate 1b₂ can be recrystallized from acetic acid. On removal of the benzene from the benzene extract, intermediate 1b₁ is isolated. These separated intermediates can then be reacted separately with one equivalent of a compound of the type IIc to IIg to give a trinuclear dye, such as, for example:

(1b₃)

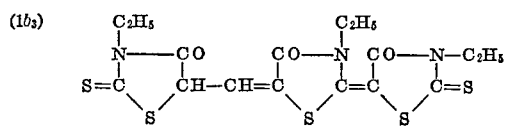

However, if the crude reaction product mixture of 1b₁ and 1b₂ above is further reacted with another equivalent of a compound of the type IIc to IIg, then depending on reaction conditions, the salt 1b₂ can be made to react faster than the other intermediate 1b₁. This can be accomplished where pyridine and triethylamine, or alcohol and triethylamine are employed as solvent. Under these conditions, the salt 1b₂ reacts preferentially with the IIc to IIg type compound, forming a trinuclear dye, e.g. 1b₃ above. The unreacted intermediate 1b₁ can be separated from the final reaction product by extracting it with a non-polar solvent such as benzene or petroleum ether.

It is therefore not necessary in the synthesis of a trinuclear oxonol dye according to the above illustrated reaction, to separate the two dinuclear intermediates 1b₁ and 1b₂ before condensing further with another equivalent of reactive compound IIc to IIg.

Where the reactive compound IIc to IIg employed for reaction with intermediate 1b₁ or 1b₂ above is different from the reactive compound first employed in producing said intermediates, isomeric asymmetrical dyes are produced, e.g.

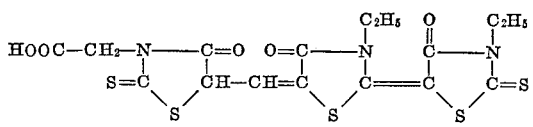

and

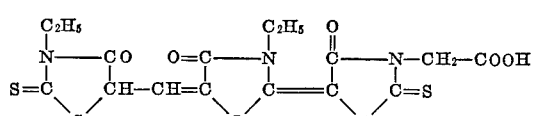

Preferred compounds of the Formula IIc–IIg noted above, are those of the thiazolone series, for example: those of the 2,4 - dioxo - thiazolidine, 2 - thiono - 4 - oxo-thiazolidine, 3 - alkyl - 2,4 - dioxo - thiazolidine (e.g. 3-ethyl - 2,4 - dioxo - thiazoline, etc.), 3 - phenyl - 2,4 - dioxo - thiazolidine, 3 - alpha - naphthyl - 2,4 - dioxo - thiazolidine, etc., those of the 2-thiono-4-oxo-thiazolidine (rhodanine) series, such as 3 - alkyl - rhodanines, (e.g. 3 - ethyl - rhodanine), 3 - aryl - rhodanine, (e.g. 3 - phenyl - rhodanine), (3 - alpha - naphthyl - rhodanine), (3-(1 - benzothiazyl) - rhodanine), etc., those of the 2 - alkylmercapto - 4(5) - thiazolone series, such as 2 - ethylmercapto-4(5)-thiazolone, etc., those of the thiazolidone series, such as 4-thiazolidone or its 3-alkyl (e.g. ethyl, etc.), 3-phenyl or 3-alpha-naphthyl derivatives, those of the 2-alkylphenylamino - 4(5) - thiazolone series (e.g. 2-ethylphenylamino - 4(5) - thiazolone, etc.), those of the 2 - diphenylamino - 4(5) - thiazolone series; those of the ozazolone series, for example, those of the 2-thiono-4-oxo-oxazolidine series, such as 3-alkyl-2-thiono-4-oxo-oxazolidine (e.g. 3 - ethyl - 2 - thiono - 4 - oxo - oxazolidine, etc.), those of the 2-imino-2,4-dioxo-oxazolidine (pseudohydantoin) series, etc.; those of the imidazolone series, for example, those of the 2,4-dioxo-imidazolidine series, (hydantoin) or its 3-alkyl, 3-phenyl or 3-alpha-naphthyl derivatives as well as its 1,3-dialkyl (e.g. 1,3-diethyl, etc.), 1 - alkyl - 3 - phenyl (e.g. 1 - ethyl - 3-phenyl, etc.), 1 - alkyl - 3 - naphthyl (e.g. 1 - ethyl - 3-alpha-naphthyl, etc.), 1,3-diphenyl, etc. derivatives, those of the 2-thiono-4-oxo-imidazolidine series, such as 2-thiono - 4 - oxo - imidazolidine (2 - thiohydantoin) or its 3-alkyl (e.g. 3-ethyl, etc.), 3-phenyl or 3-alpha-naphthyl derivatives as well as its 1,3-dialkyl (e.g. 1,3-diethyl, etc.), 1 - alkyl - 3 - phenyl (e.g. 1 - ethyl - 3 - phenyl, etc.), 1-alkyl - 3 - naphthyl (e.g. 1 - ethyl - 3 - alpha - naphthyl), 1,3-diphenyl, etc. derivatives, those of the 2-alkylmercapto - 5(4) - imidazolone series, such as 2 - n - propylmercapto - 5(4) - imidazolone; those of the thionaphthazone series, such as 2(1)-thionaphthenone or 1(2)-thionaphthenone; those of the pyrazolone series, such as pyrazolone or its 1-alkyl (e.g. methyl, ethyl, etc.), 1- phenyl, 1-naphthyl (e.g. 1-alpha-naphthyl), 3-alkyl (e.g. methyl, ethyl, etc.), 3-phenyl, 3-naphthyl (3-alpha-naphthyl), 1 - alkyl - 3 - phenyl (e.g. 1 - methyl - 3 - phenyl, etc.), 3 - alkyl - 1 - phenyl (e.g. 1 - methyl - 3 - phenyl, etc.), 3 - alkyl - 1 - phenyl (e.g. 3 - methyl - 1 - phenyl, etc.), 1,3-dialkyl (e.g. 1,3-dimethyl, etc.), 1,3-diphenyl, etc. derivatives; those of the oxindole series, such as 2,3-dihydro-3-ketoindole, and like five-membered heterocyclic nuclei; those of the 2,4,6-triketo-hexahydro series, for example, 2,4,6 - triketohexahydropyrimidine (barbituric acid), 2 - thio - 2,4,6 - triketohexahydropyrimidine (2-thiobarbituric acid) as well as their 1-alkyl (e.g. 1-ethyl, etc.) or 1,3-dialkyl (1,3-diethyl, etc.) derivatives; those of the 3,4 - dihydro - 2(1) - quinolone series, such as 3,4-dihydro - 2(1) - quinolone (dihydrocarboatyril); those of the 3,4-dihydro-2(1)-quinoxalone series, such as 3,4-dihydro - 2(1) - quinoxalone (oxydihydroquinoxaline), etc; those of the 3 - phenomorpholone (1,4,3 - benzoinsine-3(4)-one or benzo-3-morpholone) series, such as 3-phenomorpholone, etc.; those of the 1,4,2-benzothiazine-3(4)-one (ketodihydrobenzoparathiazine) series, such as ketodihydrobenzoparathiazine, etc., and like six-membered heterocyclic nuclei, such as 3-carbalkoxy-3-cyano-4-keto-2 - thiotetra - furane, 3 - carbalkoxy - 3 - cyano - 4 - keto-2-thio-thiophene series, or such of pyrimidazolone series, of the polycyclic diketopyrimidine or carbocyclic nuclei containing a reactive methylene group such as of indanedione or cyclohexanedione series (e.g. 5,5-dimethylcyclohexanedione).

The reactions, according to my invention, are carried out advantageously in the presence of solvent or diluent such as pyridine, alcohol, tertiary amine, nitrobenzene and in some instances also in water, and may be carried out in many cases at room temperature, but it is preferable in most instances to carry out the reactions at higher temperature under reflux.

The invention is in part based on the discovery that certain of my novel intermediates such as arylaminomethylene and acylarylamino-methylene, 3-substituted e.g. 3-alkyl and 3-aryl rhodanines, when quaternated, can be used as bifunctional intermediates; that is, they can be reacted, e.g. in the 2- and 5- position simultaneously, to give rise to trinuclear compounds having the same substituent, that is, in which the first and third nuclei are identical. Alternately, the bifunctional compound, by proper choice of the reaction condition, can be made to react at one position first, and the resulting dinuclear derivative is reacted thereafter on the other reactive position to form a trinuclear compound.

As noted above, the three nuclei can be different or two or all of them may be the same, if so desired. By utilizing the difference in reactivity of the two positions of the bifunctional compounds, an extremely great variety of polynuclear compounds can be produced. It is, however, understood that my invention is not limited to a certain sequence or a particular process for the preparation of these dyes and that many alternate methods of preparation of my new dyes are possible, as will be apparent from the following examples.

The methine dyes of my invention can also be designated polynuclear oxonol dyes. The advantages of my new dyes are manyfold. The dinuclear oxonol dyes hitherto disclosed have only a very limited sensitizing range, and their sensitizing maximum does not go beyond 600 mu as indicated, for example, in U.S. 2,241,238, while with the aid of the dyes of my invention, photographic emulsions can be sensitized from the short wave green to the long wave red of the spectrum, i.e. to 700 mu and beyond.

A particular advantage of my new sensitizers is that they offer an extremely wide choice of selective green and red sensitizers of outstanding properties; in particular these sensitizers are strongly adsorbed to the silver halide grain and are more resistant to the desensitizing action of dyes and dye-forming substances, particularly to acid dyes and their salts and acidic dye-forming substances and their salts. Furthermore my sensitizing dyes are more resistant to diffusion.

A further advantage of my new dyes which makes them valuable for color photography is their property of being decolorizable by photographic processing solutions. Many of the dyes decolorize extremely well with the oxidizing agents under photographic processing conditions, such as ferricyanide solutions and other oxidizing agents used for similar purposes, as distinguished from the conventional sensitizers which frequently cause residual stain.

A more detailed description of the preparation methods of the above dye intermediates is found in the examples below.

While it is possible to write the formulas used in this specification in alternate tautomeric structures, for the purpose of simpler nomenclature throughout the specification and claims only one type of the possible tautomeric formulas was used. Two alternate tautomeric formulas are illustrated by Formulas 27–a and 27–a–1.

Example 1

(1–a) 5-Anilino - methylene - 3 - ethyl - rhodanine - 2-methyl-metho-sulfate: 26.7 g. (0.1 mol) 5-anilino-methylene-3-ethyl-rhodanine was fused with 12.13 g. (0.1 mol) dimethylsulfate at 120–125° C. under stirring for 15–20 minutes. (A small portion of the product was stirred with benzene and washed with ether, M.P. 161–3.) When recrystallized from alcohol and ether, M.P. 176–178°. In this example (a), 26.7 g. 5-anilino-methylene-3-ethylrhodanine can be substituted by 30.9 g. 5-acetanilido-methylene-3-ethyl-rhodanine, using the same procedure. Thereby 5-acetanilido - methylene - 3 - ethyl - rhodanine - 2 - methyl-methosulfate was obtained which can be used in the following preparation (1–b), leading to the same product in approximately the same yield. M.P. when recrystallized from alcohol 158–163° C.

Instead of dimethylsulfate, for example, the equivalent quantity of diethylsulfate, methyl-iodide or methylbenzenesulfonate or ethyl toluene sulfonate can be used, whereby usually the same reaction conditions such as time and temperature are employed. However, in some cases longer reaction times or higher temperatures are used for best results.

(1–b) A mixture of:

(1–b₁) 5 - (5-acetanilido - methylene - 3 - ethyl - 4-oxo - thiazolidine - 2 - ylidene) - 3 - ethyl - 2 - thiono - 4-oxo-thiazolidine.

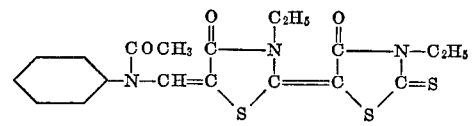

and (1–b₂) 5 - (3 - ethyl - 2 - thiono - 4 - oxo - thiazolidine-5 - ylmethylene) - 3 - ethyl - 2 - thiomethyl - 4 - oxo - thiazolidine.

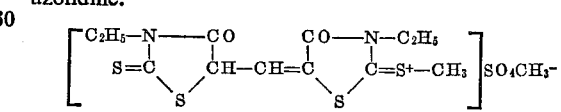

or

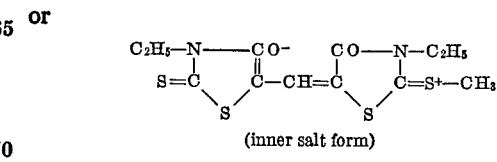

(inner salt form)

or represented in the tautomeric form

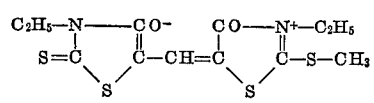

After cooling, the product (1–a) was added to 150 g. acetic anhydride in which 16 g. (0.1 mol) 3-ethyl rhodanine was dissolved. Then 8.3 g. (0.1 mol) anhydrous sodium acetate was added and the mixture heated with stirring to 100° C. for 1 hour, cooled, and the acetic anhydride decomposed by first adding 20 cc. acetic acid and followed by adding 30 ccs. water in small portions; thereafter the mixture is heated under reflux, cooled and filtered. The yield of crystalline solid was 24 g.

The crude crystalline solid was extracted 4 times with fresh portions of dry benzene by heating to boiling, cooling and filtering. The precipitate was recrystallized from acetic acid. Dark solid crystals, M.P. 243–46°. Gives a pink solution in acetone. Absorbs 450–570 mµ with an absorption maximum of about 510 mµ. The product is intermediate $1-b_2$ above. The yield of this substance is about half of the total solid.

The benzene extract after removal of the benzene, leaves a brown solid which is dissolved in the minimum quantity of boiling acetic acid, and about a tenth volume of methanol is added, and cooled. Lemon yellow crystals separate. The product is intermediate $1-b_1$ above. M.P. 250–255.

The solution of $1-b_1$ in acetone absorbs at 400–460 mµ with a sharp maximum at 440 mµ. The yield is about half of the total crude solid. From the original mother liquor, upon addition of water, a further quantity of crude precipitate can be separated, which upon crystallization from acetic acid and extraction with benzene, further quantities of intermediates $1-b_1$ and $1-b_2$ can be recovered.

Alternative procedure for preparation of compound of Example $1-b_1$, through acetlyation of compound 1–c:

(1–c) 5 - (5 - anilino - methylene - 3 - ethyl - 4 - oxothiazolidine - 2 - ylidene - 3 - ethyl - 2 - thiono - 4 - oxothiazolidine.

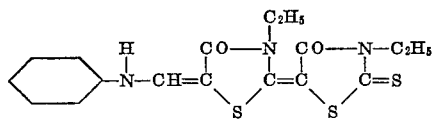

3.9 g. (0.01 mol) 5-anilino methylene-3-ethyl rhodanine-2-methyl methosulfate (1–a), and 1.61 g. (0.01 mol) ethylrhodanine were suspended in 50 cc. dry benzene, and 1.01 g. (0.01 mol) triethylamine was added. The mixture was refluxed for 25 minutes; it becomes homogeneous. After cooling it was filtered and the benzene solution was evaporated in vacuum. The brown residue was recrystallized from ethanol. Yield about 1 g. brownish orange crystal, M.P. 204–208°. It forms a yellow solution in acetone, absorbing from 430–490 mµ with maximum at 470 mµ. The compound is acylated by refluxing for 20 min. in 30 cc. acetic anhydride to which 0.25 g. triethylamine was added. Upon addition of 90 cc. methanol the acetyl compound of M.P. 251–255° separates, which is the compound of Example $1-b_1$.

(1–d) 5[ - 5 - (3 - methyl - 1 - phenyl - 5 - oxo - pyranolyl - 4 - methylene) - 3 - ethyl - 5 - oxo - thiazolidine-2 - ylidene] - 3 - ethyl - 2 - thiono - 4 - oxo - thiazolidine.

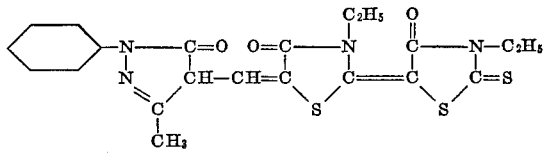

4.34 g. (0.01 mol) 5(5-acetanilido-methylene-3-ethyl-4-oxo-thiazolidine - 2-ylidene)-3 - ethyl-2 - thiono-4-oxothiazolidine ($1-b_1$) was dissolved in 40 ccs. pyridine and 1.74 g. (0.01 mol) 3-methyl-1-phenyl-5-pyrazolone and 3.4 ccs. of triethylamine were added and then refluxed for 15 minutes and the solution poured into 1 liter water acidified with hydrochloric acid. A reddish violet dye separates which is recrystallized from methanol. The solution of the dye in methanol, containing pyridine and triethylamine has an absorption maximum at 525. If the intermediate $1-b_2$ is substituted for $1-b_1$, than a violetish magenta dye forms with an absorption maximum at 572. In that case the isomeric dye is formed where the first and third heterocyclic nuclei of the above structural formula are interchanged.

(1–e) The anilino methylene - 3 - ethyl - rhodanine in the above Examples 1–a–1–d can be replaced with the corresponding equivalent of anilino-methylene or acetanilido-methylene, anilino - allylidene, acetanilido - allylidene, anilino-pentadienylidene or acetanilido-pentadienylidene derivative of, for example, 3-methyl rhodanine, 3-propyl - rhodanine, 3 - hexyl - rhodanine, 3 - phenyl - rhodanine, 3-β-phenyl-ethyl-rhodanine, 3-naphthyl-rhodanine, 3(β - pyridyl) - rhodanine, 3(2 - thiazolyl) - rhodanine, 3-amino--rhodanine, 3-methylamino-rhodanine, 3-dimethylamino-rhodanine, 3-acetylamino - rhodanine, 3 - diacetylamino-rhodanine, 3-succinylamino-rhodanine, 3-acyl-rhodanine, e.g., 3-benzoyl-rhodanine or a thiohydantoin, e.g., 1-phenyl-3-allyl-2-thiohydantoin.

Example 2

5-[5(3 - carboxymethyl - 2 - thiono-4-oxo-thiazolidine-5-yl-methylene)-3-hexyl-4 - oxo - thiazolidine-2-ylidene]-3-carboxymethyl-2-thiono-4-oxo-thiazolidine.

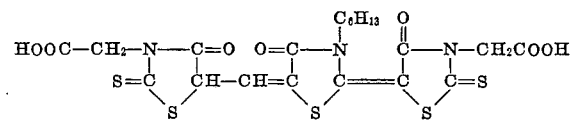

3.2 g. (0.1 mol) 5-anilino-methylene-3-hexylrhodanine and 1.6 cc. methylbenzene sulfonate 0.012 mol were fused at 130° for 1½ hours. Added 8 cc. pyridine, 7.75 g. (0.02 mol) 3-carboxy-methylrhodanine and 3 cc. triethylamine and refluxed for 15 minutes. The blue-violet solution was poured into water which was acidified with hydrochloric acid. Precipitate dissolved in 150 cc. methanol. The filtered solution was poured into water to which acetic acid was added. A violet precipitate forms, which is filtered and recrystallized from 30 cc. methanol. On cooling 0.16 g. (2.65%) crude yield violet crystalline dye of M.P. 197–205 separates, which, upon further recrystallization from 15 cc. methanol yields 0.08 g. dye of M.P. 207–208. The dye sensitizes silver bromo-iodide emulsion strongly from 520 to 720 mµ with a maximum about 670, when used in conc. of 10 mg. per liter emulsion. The absorption maximum of the dye in methanol containing pyridine and triethylamine is 592 mµ.

Example 3

Intermediate 3–a:—4.46 g. 5 - anilino - methylene-3-hexyl - 2 - methyl - mercapto - 4 - oxo-thiazoline-methosulfate was added to 3.88 g. 3-carboxy-methylrhodanine and 1.6 g. sodium acetate anhydrous in 40 cc. acetic anhydride and was heated for 20 minutes. To the solution was added 50 cc. water and 50 cc. acetic acid. Upon cooling a crude semi-crystalline substance separates. Melting point 205–210°. It dissolves in sodium bicarbonate with a bright orange red color.

(3–b) 5[5-(3-carboxymethyl-2-thiono - 4 - oxo - thiazolidine-5-ylmethylene)-3-hexyl - 4 - oxo - thiazolidine-2-ylidene]-3-hexyl-2-thiono-4-oxo-thiazolidine.

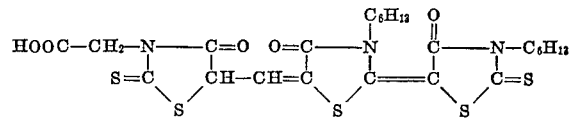

2.4 g. of the crude intermediate 3–a, 1.19 g. (0.005 mol) 3-hexyl-rhodanine were dissolved in 20 cc. pyridine and 2 ccs. triethylamine added and refluxed for 15 minutes. Precipitated with 200 cc. water and 30 cc. conc. hydrochloric acid. Precipitate filtered, washed with dilute hydrochloric acid and recrystallized from methanol. A dark violet dye formed which sensitizes a silver bromoiodide emulsion in a concentration of 5–10 mg. per liter emulsion between 565–700 mu, with a maxium about 660 mu. Absorption maximum of the dye in methanol-pyridine-triethylamine about 594 mu.

Example 4

5[5-(3-carboxymethyl - 2 - thiono-4-oxo-thiazolidine-5-yl-methylene)-3-ethyl-4-oxo - thiazolidine - 2-ylidene]-3-ethyl-2-thiono-4-oxo-thiazolidine.

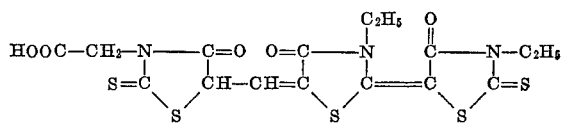

4.33 g. (0.01 mol) 5(5-acetanildo-methylene-3-ethyl-4-oxo-thiazolidine-2-ylidene)-3 - ethyl-3 - thiono-4 - oxo-thiazolidine (Example 1–$b_1$), 2.05 g. (0.01 mol) 3-carboxymethyl-rhodanine, 20 cc. pyridine, and 1.4 g. triethylamine was refluxed for 15 minutes, the mixture poured in water acidified with hydrochloric acid, filtered. The precipitate was dissolved in 1 liter water containing 5 g. sodium bicarbonate; reprecipitated with acid and filtered. Recrystallized from methanol. Yield 39%, M.P. 201–203°. Powerful red sensitizer for silver halide emulsion; in a quantity of 5–50 mg. per liter is sensitized from 550–700 mu. Maximum about 660 mu. Absorption maximum of methanol-pyridine solution about 594 mu.

Example 5

5[5-(3-ethyl-2-thiono - 4 - oxo - thiazolidine - 5 - yl-2-methylene)-3-ethyl-4-oxo-thiazolidine-2-ylidene] - 1 - carboxymethyl-3-phenyl-2-thiono-4-oxo-imidazolidine.

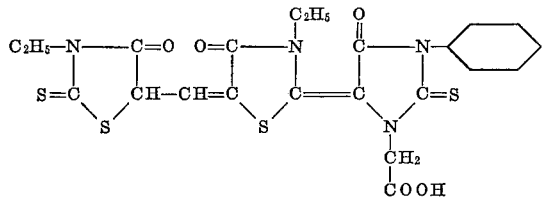

4.35 g. (0.01 mol) of the crude intermediate of Example 1–b, 2.58 g. (0.01 mol) 1-carboxymethyl-3-phenyl-2-thiohydantoin, 30 cc. pyridine, 1.4 g. triethylamine were boiled for 3 minutes. A violet dye formed. The mixture was poured in water acidified with HCl; the precipitate filtered. Redissolved in bicarbonate solution, precipitated with acetic acid and recrystallized from methanol. Dark powder, which sensitizes the photographic bromide emulsion from 520 to about 700 mu in a concentration between 5–50 mg. per liter.

Example 6

5[5-(3-tetradecyl - 2-thiono-4 - oxo - thiazolidine-5-yl-methylene)-3-ethyl-4-oxo-thiazolidine-2-ylidene] - 3 - β-sulfoethyl-2-thiono-4-oxo-thiazolidine.

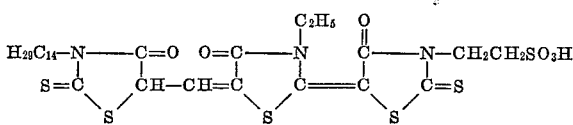

7.60 g. (0.02 mol) 5-anilino-methylene-3-ethyl-rhodanine-2-methylmethosulfate (Example 1–a), 1.7 g. sodium acetate, 30 cc. acetic anhydride, 7.23 g. (.022 mol) 3-tetradecyl-rhodanine was boiled for 25 minutes. To the mixture was added 55 cc. methanol and 10 cc. water. The orange precipitate was filtered off, washed with cold methanol. Dissolved in hot isopropanol, from which yellow crystals separate, which are discarded. The filtrate is precipitated with water. The orange brown precipitate is dissolved in a mixture of 40 cc. isopropanol, 20 cc. pyridine, 25 cc. water. To the solution 4.8 g. (0.02 mol) 3-beta-sulfo-ethylrhodanine and 16 cc. triethylamine was added and the solution boiled for 15 minutes. The deep blue violet solution was poured into water. The mixture acidified with hydrochloric acid. Filtered and the precipitate dissolved in 100 cc. methanol. Precipitated with 3 g. anhydrous sodium acetate. Washed with methanol containing anhydrous sodium acetate, whereby yellow and red impurities are dissolved. Washed with methanol and water. Yield about 10%.

The dye is a powerful sensitizer for silver bromide emulsion, in a quantity of 10–50 mg. per liter emulsion, in a concentration of 10–50 mg. per liter. It sensitizes from 540–700 mu with a maximum at 660 mu. Absorption maximum 595 mu.

Example 7

5[5(3 - ethyl-4-oxo-thiazolidine - 5 - yl-methylene)-1-phenyl-3-allyl-4-oxo-imidazolidene - 2-ylidene] - 3-ethyl-2-thiono-4-oxo-thiazolidine.

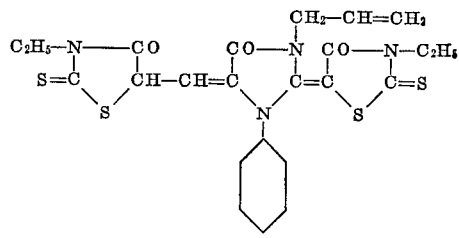

1 g. 5-anilino-methylene-1-phenyl-3-allyl-thiohydantoin and 1 ml. dimethylsulfate was heated at 110–115° C. for 20 minutes and the product precipitated with benzene and ether. The crude precipitate was added to a solution of 1 g. 3-ethylrhodanine and 1 g. piperidine in 10 ccs. pyridine and warmed. The dye was isolated by pouring the solution in water and acid in the usual way. The isolated dye has an absorption maximum in alcohol at 580 mu. It sensitizes a silver halide emulsion strongly for green and red.

Example 8

5[(alpha-cyanoacetanilide-5-yl-methylene) - 3-ethyl-4-oxo-thiazolidine-2-ylidene]2 - ethylidene-3-ethyl-2-thiono-4-oxo-thiazolidine.

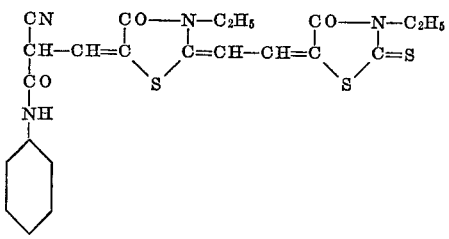

0.2 g. 5(alpha-cyanoacetanilido-methylene)-3-ethyl-2-thiono-4-oxo-thiazolidene, also designated as [cyanacetanilido]-[3-ethylrhodanine (5)]-methinoxonol is heated with .5 cc. dimethylsulfate for 25 minutes at 110–20° C., and precipitating the crude quaternary salt with ether; then heated with a solution of .3 g. 5-ethylidene-3-ethylrhodanine and .5 cc. triethylamine in methanol. A blue-green dye with an absorption maximum of about 610 mu is formed which can be isolated in the usual way. It sensitizes a silver halide emulsion to the red part of the spectrum.

Example 9

5[5(3 - ethyl-2-thiono-4-oxo-thiazolidine - 5-yl-methylene)-3-ethyl-4-oxo-thiazolidine-2-ylidene] - 2 - ethylidene-3-ethyl-2-thiono-4-oxo-thiazolidine.

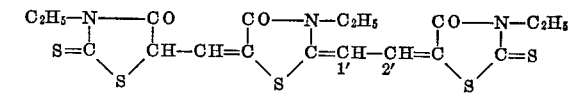

.36 g. (001 mol) intermediate 1–$b_2$ was added to a solution of .19 g. (.001 mol) 5-ethylidene-3-ethyldrhodanine and 0.3 cc. triethylamine in methanol and heated.

A blue-green dye with an absorption maximum of 650 mu is formed. The dye isolated and purified in the usual way sensitizes a silver halide emulsion strongly to the red.

Instead of 5-ethylidene-3-ethylrhodanine, the 5-isopropylidene-3-ethylrhodanine can be used, which results in a dye of the same absorption maximum and sensitizing properties. The dye carries a methyl substituent in 2' position of the ethylidene group.

Example 10

Intermediate 10–a: 3.9 g. (0.01 mol) 5-aniline-methylene-3-ethyl-rhodanine-2 - methyl-methosulfate (Example 1–a), 3.05 g. 3-carboxymethyl-rhodanine, 2.5 g. sodium acetate anhydrous and 20 cc. acetic anhydride was refluxed for 30 minutes. After decomposition of the acetic anhydride with 45 cc. water, on standing, red crystals of M.P. 167–68° C. separate.

(10–b) 5[5-(3-carboxy-methyl-2-thiono-4-oxo-thiazolidine-5-yl-methylene)-3-ethyl-4-oxo-thiazolidine - 2 - ylidene]-3-tetradecyl-4-oxo-2-thiono-thiazolidine.

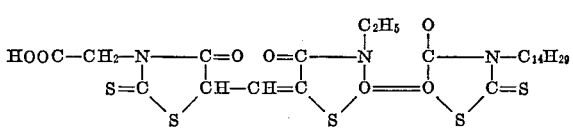

2.5 g. (0.05 mol) of the crude intermediate 10–a, 1.65 g. (0.005 mol) 3-tetradecyl-rhodanine, 1,4 cc. triethylamine and 15 cc. pyridine was heated for 15 minutes. The dark blue violet mixture poured into water acidified with hydrochloric acid. The precipitate filtered, washed with water and reprecipitated from a pyridine solution. Dark violet powder. Sensitizer for silver bromide, from 550–700 mu with a maximum at 660 mu.

Example 11

Intermediate 11–a: 3.9 g. (0.01 mol) 5-anilino-methylene-3-ethyl-rhodanine-2 - methyl-methosulfate (Example 1–a), 1.8 g. (0.01 mol) 3-beta-hydroxyethyl-rhodanine, 20 cc. acetic anhydride, 0.83 g. anhydrous sodium acetate, were heated on reflux for 25 minutes. To this 40 cc. water was added dropwise, heated under reflux, cooled. The resulting semisolid was washed several times with water and used without purification for preparation 11–b.

(11–b) 5[(3-beta-acetoxyethyl-2-thiono - 4 - oxo - thiazolidine - 5 - yl - methylene) - 3 - ethyl - 4 - oxo - thiazolidine - 2 - ylidene] - 3 - beta - hydroxyethyl - 2 - thiono-4-oxo-thiazolidine.

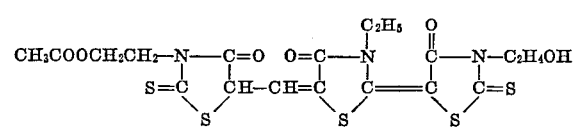

4.5 g. of the crude intermediate 11–a, 1.8 g. (0.01 mol) 3-beta-hydroxyethyl-rhodanine, 2 g. triethylamine, 25 cc. pyridine, were boiled for 10 minutes. The deep blue violet solution was poured into water acidified with hydrochloric acid, recrystallized from methanol twice. A dark blue violet dye was obtained at 30% yield, M.P. 158–162° C. The dye is a powerful sensitizer for silver bromide, chlorobromide and chloride emulsions, from 560–700 mu with a maximum at 660 mu.

Example 12

5[5 - (3 - beta - acetoxyethyl - 2 - thiono - 4 - oxo-thiazolidine - 5 - yl - methylene) - 3 - hexyl - 4 - oxo-thiazolidine - 2 - ylidene] - 3 - hydroxyethyl - 2 - thiono-4-oxo-thiazolidine.

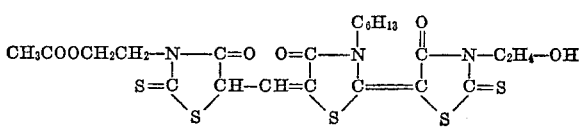

Similar preparation to Example 11 in which 4.5 g. 5 - anilino - methylene - 3 - hexylrhodanine - 2 - methyl-methosulfate was used instead of 3.9 g. 5-anilido-methylene-3-ethyl-rhodanine-2-methyl methosulfate. After two crystallizations from methanol a dark blue violet dye was obtained in 16% yield, M.P. 133–4° C. The dye sensitized silver halide emulsions to 700 mu with a maximum at 660 mu in a concentration of 10–50 mg. per liter emulsion containing between 20–50 g. silver halide per liter.

Example 13

5 - (5 - acetanilido - methylene - 3 - ethyl - 4 - oxo-thiazolidine - 2 - ylidene) - 2 - thiobarbituric acid.

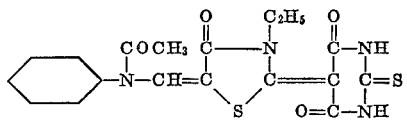

3.9 g. anilino - methylene - 3 - ethyl - rhodanine - 2-methyl-methosulfate, 14.4 g. thiobarbituric acid, 1.0 g. sodium acetate anhydrous and 20 ccs. acetic anhydride were heated for 25 minutes. The acetic anhydride decomposed with water. Upon cooling an orange brown powder separates which does not melt at 290° C. This is a mixture which contains the compound represented by the above structural formula.

Example 14

[5(2 - thiono - 4,6 - dioxo - pyrimidine - 5 - yl - methylene) - 3 - ethyl - 4 - oxo - thiazolidine - 2 - ylidene]-dicyano-methylene.

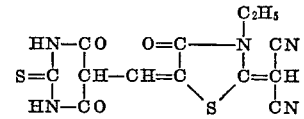

2.08 g. of the crude intermediate of Example 13, 0.36 g. (0.0055 mol) malonitrile, 15 cc. pyridine and 1 cc. triethylamine was heated together; on dilution with water an orange yellow dye separates. The absorption maximum in methanol solution containing some pyridine and triethylamine is at 430 mu. The dye sensitizes silver chloride emulsion in 10–50 mg. per liter emulsion to the short wave green.

Example 15

[5(2 - thiono- 4,6 - dioxo - pyrimidine - 5 - yl - methylene) - 3 - ethyl - 4 - oxo - thiazolidine - 2 - ylidene]-cyano-carboxy-ethyl-methylene.

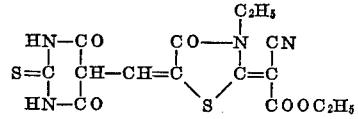

In a similar preparation to Example 14, the malonitrile was replaced by .66 g. (0.005 mol) ethylcyanoacetonitrile. A yellow dye was obtained. It has an absorption maximum in methanol triethylamine solution at 475 mu. It sensitizes silver chloride emulsion to the short wave green.

Example 16

[5(2 - thiono - 4,6 - dioxo - pyrimidine - 5 - yl - methylene) - 3 - ethyl - 4 - oxo - thiazolidine - 2 - ylidene]-cyano-benzoyl-methylene.

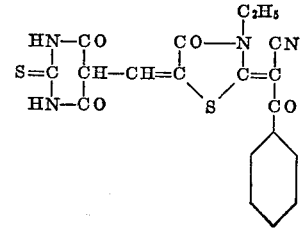

In a similar preparation to Example 14 the malonitrile was replaced by 0.8 g. benzoylacetonitrile. An orange powder separates in water on acidification with hydrochloric acid. It is purified by adding isoproylalcohol to a hot solution of the dye in pyridine. It darkens only when heated over 270° C. without melting. Its absorption maximum in methanol triethylamine is 500 mu. It sensitizes bromoiodide emulsion in a concentration of 10–50 mg. per liter strongly to 580 mu with a maximum at 540 mu.

Example 17

5[5(2 - thiono - 4,6 - dioxo - pyrimidine - 2 - yl-methylene) - 3 - ethyl - 4 - oxo - thiazolidine - 2 - ylidene] - 3-ethyl-2-thiono-4-oxo-thiazolidine.

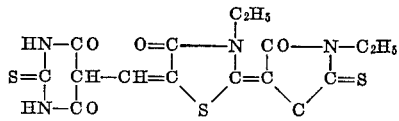

In a similar preparation to Example 14 the malonitrile is replaced by 0.75 g. 3-ethyl-2-thiono-2,4-oxazoledione. A brownish orange dye separates with water on acidification. 61% crude yield, which on recrystallization from hot pyridine isopropanol is obtained in 34% yield. Darkens over 270° C. without melting. The absorption maximum in methanol triethylamine solution is 510 mu. The dye is a powerful sensitizer for silver bromoiodide in a concentration of 10–50 mg. per liter emulsion. Sensitivity extends to 615 mu with a maximum at 560 mu.

Example 18

5[5(4,6 - dioxo - 2 - thiono - pyrimidine - 5 - yl-methylene) - 3 - ethyl - 4 - oxo - thiazolidine - 2 - ylidene]-2-thiono-4,6-dioxo-pyrimidine.

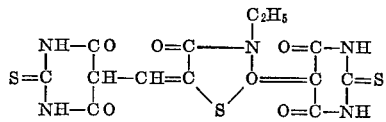

In a similar preparation to Example 14 the malonitrile is replaced by 0.75 g. thiobarbituric acid. A red dye is isolated which has an absorption maximum in methanol triethylamine solution at 525 mu.

Example 19

5[5-(2-thiono - 4,6 - dioxo-pyrimidine-5-yl-methylene)-3 - ethyl-4-oxo-thiazolidine-2-ylidene]3 - ethyl-2-thiono-4-oxo-thiazolidine.

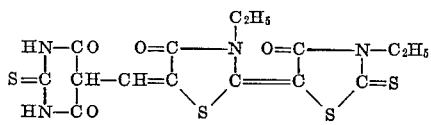

In a similar preparation to Example 14 the malonitrile is replaced by 0.8 g. 3-ethyl-rhodanine. A red dye is obtained which absorbs in methanol triethylamine at 520 mu. It sensitizes silver halide emulsion strongly to about 625 mu with a maximum at about 580 mu.

Example 20

5[5 - (3-acetoxyethyl-2-thiono-4-oxo-thiazolidine-5-yl-methylene)-3-methyl-1-ethyl-4-oxoimidazoline-2-ylidene]-3-beta-hydroxy-2-thiono-4-oxo-thiazoline.

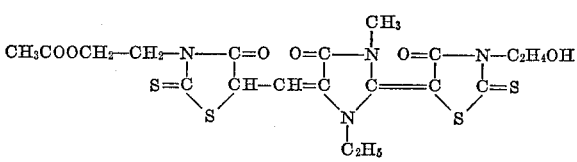

2.61 g. 5-anilidomethylene-1-ethyl-3-methyl-2-thiohydantoin and 1.26 g. dimethylsulfate fused for 25 minutes at 130° C. Mixture was dissolved then heated in 25 cc. acetic anhydride with 1.77 g. hydroxyethyl-rhodanine and 6.3 g. sodium acetate anhydrous for 30 minutes. The mixture was precipitated with water and the brownish-red semisolid washed several times with water. The semisolid dissolved in a mixture of 20 cc. pyridine, 1.8 cc. triethylamine and 1.7 g. 3-beta-hydroxyethyl-rhodonine and then boiled for 6 minutes. Turns deep dark cherry red. The dye is isolated by precipitation with water, acidified with hydrochloric acid. It forms a dark powder, which dissolves in methanol triethylamine and has a sharp absorption line with a maximum at about 580 mu. It sensitizes silver halide emulsions to about 680 mu. It is used in a concentration of 5–50 mg. per liter emulsion.

Example 21

5[5(3-ethyl-2-thiono - 4 - oxo-thiazolidine-yl-5-methylene) - 3-ethyl-4-oxoethiazolidine-2-ylidene]-4,6-dioxy-2-thionopyridine.

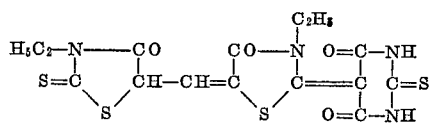

1 g. of the crude intermediate of Example 1–b, .46 g. (0.003) mol) thiobarbituric acid, 10 cc. pyridine and 1 cc. triethylamine were heated for 10 minutes and precipitated with water acidified with hydrochloric acid. Precipitate was dissolved in pyridine (5 cc.) filtered, methanol added and kept in refrigerator. Crystals with green lustre filtered off. Crystals redissolved in 7 cc. pyridine, added hot 25 ml. methanol, filtered from some precipitate and reprecipitated with water and acetic acid. Dark product. Easily soluble in methanol, with violet color. It is a powerful sensitizer for silver halide emulsion. A bromoiodide emulsion sensitized in a concentration of 10–50 mg. per liter from 550–685 with a maximum at 640 mu.

Example 22

5[5(3-ethyl-2-thiono - 4 - oxo-thiazolidine-yl-5-methylene)-3-ethyl-4-oxo - thiazolidine-2-ylidene]-1,3-di-n-butyl-2-thiono-4,6-dioxo-pyrimidine.

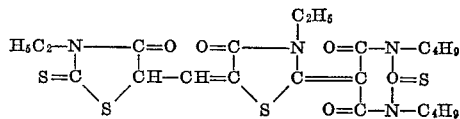

In a similar preparation to Example 21 in which the thiobarbituric acid was replaced by 0.8 g. 1,3-di-n-butyl-thiobarbituric acid. A purple dye was obtained which is easily soluble in methanol. It sensitizes a silver bromoiodide emulsion in a concentration of 10–50 mg. per liter strongly from 550–690 mu with a maximum at 650 mu.

Example 23

Bis 5[5(3-carboxymethyl-2-thiono-4-oxo - thiazolidine-yl-5-methylene)-3-ethyl-4-oxo - thiazolidine-ylidene]-3,3'-hexamethylene-bis-2-thiono-4-oxothiazolidine.

$$\left[ \text{HOOC—CH}_2\text{—N} \begin{array}{c} \text{—C=O} \\ \text{CH—CH=C} \\ \diagdown \text{S} \diagup \end{array} \begin{array}{c} \text{O=C—N} \\ \text{C===C} \\ \diagdown \text{S} \diagup \end{array} \begin{array}{c} \text{C}_2\text{H}_5 \\ | \\ \text{O=C—N—(CH}_2)_3\text{—} \\ \text{C=S} \\ \diagdown \text{S} \diagup \end{array} \right]_2$$

2 g. of the crude intermediate of Example 10–a, 0.56 g. hexamethylene-bis-3,3'-rhodanine, 12 cc. pyridine and 0.5 cc. triethylamine were heated for 12 minutes and precipitated with water which was acidified with hydrochloric acid. Precipitate dissolved in hot pyridine, filtered, precipitated with methanol. Redissolved in pyridine and upon addition of isopropanol and boiling finally 0.35 g. dark blue powder obtained which has a M.P. above 265° C. Sensitizes bromoiodids emulsions in a concentration of 10–50 mg. per liter from 550 to 700 mu, maximum 660 mu.

Example 24

[A5-(1,1'-dicyanoethylene-2)-3-ethyl-4-oxo-thiazolidine-2-ylidene)]-malonitrile.

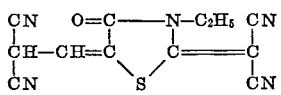

1.55 g. (0.005 mol) 5-anilido-methylene-3-ethyl-rhodanine-2-methyl-methosulfate, .66 g. malonitrile, 15 cc. pyridine, 3 cc. triethylamine, 1 cc. acetic anhydride were heated for 10 minutes, precipitated with water. A yellow dye separates.

Example 25

[5-(benzoyl-acetonitril-methylene) - 3-ethyl-4-oxo-thiazolidine-2-ylidene]-benzoylacetonitrile.

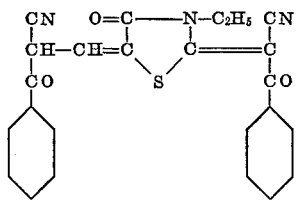

In a similar preparation to Example 24, when the malonitrile was substituted by 1.5 g. benzoylacetonitrile a yellow dye was isolated.

Example 26

[5-(alpha-cyanoacetanilide-methylene) - 3 - ethyl - 4-oxo-thiazolidine-2-ylidene-alpha-cyanoacetanilide:

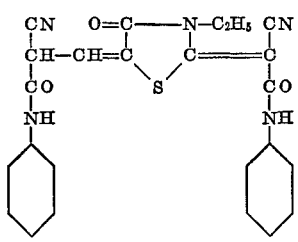

In a similar preparation to Example 24 where malonitrile was substituted by 1.6 g. alpha-cyanoacetanilide A yellow dye was precipitated.

Example 27

(27–a) 3-ethyl-rhodanine-(5) - thionaphthene - (2) - one-methin-oxonol.

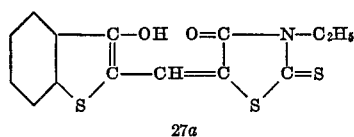

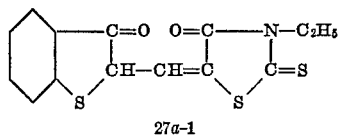

2.64 g. (0.01 mol) 5-anilino-methylene-3-ethyl - rhodanine. 2 g. (0.133 mol) 3-oxo-thionaphthene, 30 cc. methanol and 5 cc. piperidine was refluxed for 90 minutes. The violet solution poured into water and acidified with hydrochloric acid. The brownish red precipitate recrystallized from dilute acetic acid. Brownish red crystals separate which darken at 290°C. without melting. I prefer to use the tautomeric structure of Formula 27–a–1 for this and analogous compounds.

(27–b) 5[5-(3-oxo-thionaphthene - 2 - yl-methylene) - 3-ethyl-4-oxo-thiazolidine-ylidene] - 3 - ethyl - 2 - thiono-4-oxo-thiazolidine.

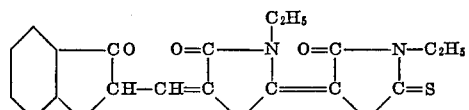

1.5 g. of the oxonol dye of Formula 27–a was fused with 1 cc. dimethylsulfate for 25 minutes at 135° C. and the melt heated for 10 minutes with a mixture of 20 cc. pyridine, 0.8 g. 3-ethyl-rhodanine, 2 cc. triethylamine. A blue dye is formed which is precipitated with water, acidified with hydrochloric acid. The dye is washed with water, dried and recrystallized from pyridine isopropanol. M.P. about 235° C. The absorption maximum of the dye dissolved in methanol containing triethylamine 614 mu.

(27–c) The identical dye is formed when the crude intermediate of Example 1–b, 1 g. 3-oxo-thionaphthene (0.065 mol) (30% excess), 16 cc. pyridine, 1.4 cc. triethylamine is refluxed for 25 minutes and isolated as in 27–b.

Example 28

3[5-(3-ethyl-2-thiono - 4 - oxo-thiazolidine-5-yl-methylene)-3-ethyl-4-oxo-thiazolidine-2 - ylidene] - 1 - methyl-2,4-dioxo-tetrahydroquinoline.

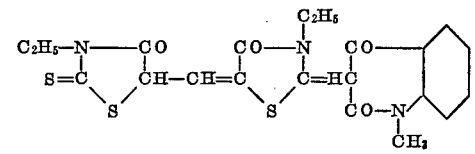

0.9 g. (0.005 mol) 1-methyl - 2,4 - dioxo - tetrahydroquioline, 2.2 g. of the crude intermediate of Example 1–b, 15 cc. pyridine, 2.35 cc. triethylamine was refluxed for 25 minutes. The purple solution was poured into water and acidified with hydrochloric acid and washed with several portions of water until free from a water soluble red dye. Triturated with hot methanol several times and the insoluble residue recrystallized from pyridine, isopropanol. Solution in methanol-triethylamine has an absorption maximum at about 598 mu.

Example 29

4[5(3-methyl - 1 - para-sulfophenyl-pyrazolone - 5 - 4-yl-methylene) - 3 - ethyl-4-oxo-thiazolidine-2-ylidene)]-3-methyl-1-para-sulfophenyl-pyrazolone (5):

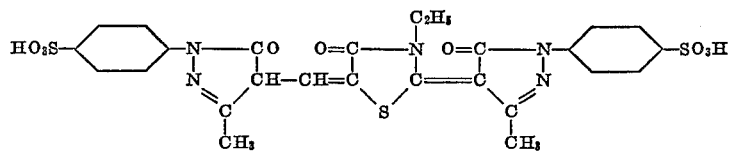

1.95 g. (0.005 mol) 5-anilino-methylene-3-ethyl-rhodanine-2-methyl-methosulfate. 50 cc. methanol. 2.54 g. (0.01 mol) 3-methyl-1-para - sulfophenyl-5-pyrazolone, and 2.1 cc. (0.015 mol) triethylamine were heated for ten minutes. A purplish magenta dye forms. The solution is poured into water acidified with dilute hydrochloric acid. A dark magenta dye is formed. The solution of the dye is suitable for filter layers and antihalation layers. It is decolorized by photographic processing bath such as developer or acid fixing bath.

Example 30

4[5(3-methyl-1 - para-carboxyphenyl - 5 - pyrazolone-4-ylidene-methylene)-3-ethyl - 4 - oxo-thiazolidine - 2 - ylidene]-3-methyl-1-para-carboxyphenyl-pyrazolone:

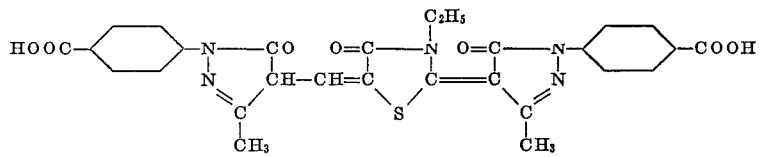

3-methyl-sulfophenyl-methyl - pyrazolone of Example 29 is replaced by 2.2 g. (.01 mol) 3-methyl-1-para-carboxyphenyl-5-pyrazolone, and the procedure carried out in the same way. A dark magenta dye separates.

Example 31

4[5(3 - methyl-1-phenyl - 5 - pyrazolone - 4 - ylidenemethylene)-3-ethyl-4-oxo-thiazolidine - 2 - ylidene] - 3-methyl-1-phenyl-pyrazolone.

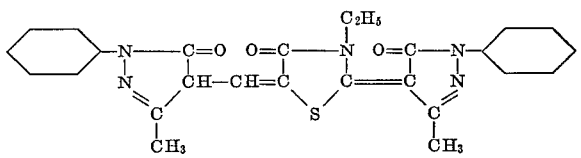

The same procedure as Example 29 is followed except that 1.74 g. (0.01 mol) 3-methyl-1-phenyl - 5-pyrazolone is used instead of 3-methyl-1-para-sulfophenyl - 5-pyrazolone. A dark water insoluble powder is isolated.

Example 32

(32–a) Intermediate: 3.9 g. (0.01 mol) 5-anilino-methylene-3-ethyl-rhodanine-2-methyl-methosulfate (Example 1–a), 1.58 g. (.01 mol) 1-ethyl-3-methyl-2-thiohydantoin, 15 cc. acetic anhydride, and 0.83 g. sodium acetate anhydrous was refluxed for 20 minutes; added 25 cc. water dropwise and finally heated. Left in refrigerator, whereby reddish brown fine needles of melting point 274° C. separate (23% yield).

(32–b) 5[5-(3 - beta-hydroxyethyl-2-thiono-4-oxo-thiazolidine-2-yl-methylene)-3-ethyl - 4 - oxo thiazolidine-2-ylidene]-1-ethyl-3-methyl-2-thiono-4-oxo-imidazolidine.

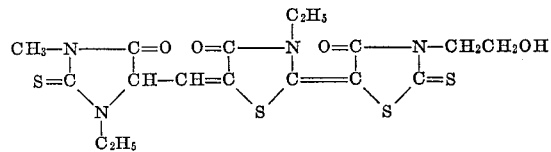

0.4 g. of the crude intermediate of 32–a, 0.35 g. (.002 mol) (100% excess) beta-hydroxy-ethyl-rhodanine, 0.6 cc. triethylamine and 10 cc. pyridine was heated to reflux 10 minutes. The clear cherry red solution changes to vivid blue violet. The mixture was precipitated with water acidified with hydrochloric acid and buffered with sodium acetate. The precipitate is recrystallized from methanol containing some sodium acetate. Dark powder. The dye sensitizes strongly bromoiodide emulsion from 520 to 720 mu with a flat maximum at 670 mu when used e.g. in a concentration of 10 mg. per liter emulsion.

Example 33

5[5-(2-thiono-4-oxo-thiazolidine - 5 - yl - methylene-)-3 - ethyl-4-oxo-thiazolidine - 2 - ylidene]-2-thiono-4-oxo-thiazolidine.

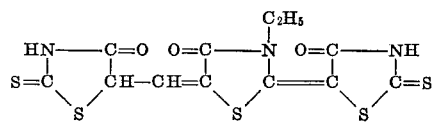

3.9 g. (0.01 mol) 5 - anilino-methylene-3-ethyl-rhodanine-2-methyl-methosulfate (Example 1–a), 3.2 g. (0.024 mol) rhodanine, 15 cc. pyridine, 6 cc. triethylamine, 3 cc. acetic anhydride, were boiled for 45 minutes, then cooled, 10 cc. of acetic acid and 60 cc. methanol added and kept in refrigerator for 12 hours. Small crystals of bronze reflection separate. Filtered and washed with methanol. Yield 1.6 g. (39%). Absorption maximum about 588 mu in methanol-triethylamine solution. It sensitizes silver bromide emulsions from 340 to 690 mu.

Example 34

5[5(2-methylthio - 4 - thiazolone - 5 - yl-methylene)-3-ethyl-4-oxo-thiazolidine - 2 - ylidene] - 2 - methylthio-4-thiazolone.

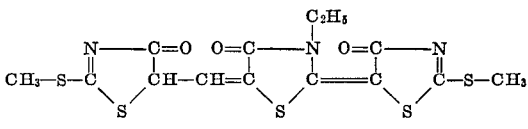

4 g. (0.02 mol) 5[5-(2-thiono-4-oxo-thiazolidine-5-yl-methylene)-3-ethyl - 4 - oxo - thiazolidine-2-ylidene]-2-thiono-4-oxo-thiazolidine. Can be suspended under stirring in 100 cc. methanol 1.5 g. powdered KOH, and 3.8 g. methyl-toluenesulfonate added. After refluxing for 30 minutes and cooling, a dark violet dye separates. The precipitation can be completed by adding water and dye recrystallized from acetic acid. It will sensitize silver halide emulsions from 540 to about 690 mu.

Example 35

A multilayer photographic material suitable for the dyebleach process can be manufactured, as will be described in the following.

(35–a) To one liter medium high speed photographic silver bromide emulsion containing 20–30 g. silver halide per liter emulsion is added 20 mg. of any one of the trinuclear dyes prepared according to Example 6, 7, 9, 10, 22 or 23. The dyes may be dissolved in alcohol or acetone (20–50 cc.), to which a small quantity of sodium bicarbonate and some water may be added. The emulsions are preferably stirred at 38° C. for 10–30 minutes and thereafter 250 cc. of a 20% solution of a cyan azo dye prepared according to Example 3 of U.S. Patent 2,612,496 is added. This cyan dye has the following Formula I:

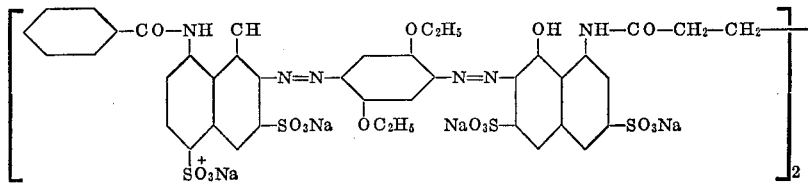

19

One to 2 liters of water and the usual quantities of spreading agent and hardener are added. The above quantity of emulsion is coated on a white or transparent base to cover 12–25 square meters. Thus a cyan layer of high red sensitivity is obtained.

(35–b) On top of the cyan layer a green sensitive magenta colored layer is coated. The same quantity of emulsion is used, to which per liter 10–20 mg. of a sensitizer described in Example 16 or 17 is added, under stirring. To the sensitized emulsion 250 cc. of a 2% solution of a magenta azo dye of Example 7, U.S. Patent 2,644,753 is added, diluted and coated for the same area as described under 35–a of this example. This magenta dye is a polymeric dye having a plurality of dye units of the following formula:

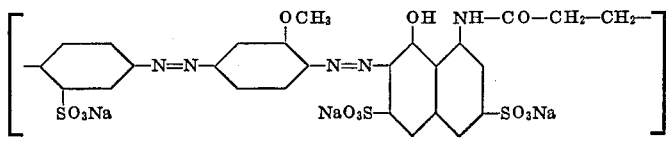

(35–c) On top of the magenta layer a blue sensitive yellow colored layer is coated, containing the same quantity of silver halide as in (a) and (b) of this example, to which 250 cc. of a 2% solution of yellow azo dye was added, prepared according to Example 6 of U.S. Reissue Patent 23,357. This yellow dye is a polymeric dye having a plurality of dye units of the following formula:

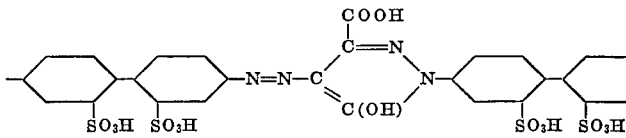

The color sensitivity of the red and green sensitive layers is high, of excellent keeping quality, and the sensitizers leave no residual stain after the usual processing.

Example 36

A three layer color photographic material is coated, composed of a red, a green and blue sensitive emulsion layer. The emulsion containing 20–50 g. silver bromide, chlorobromide or chloride per liter emulsion.

(36–a) A red sensitive emulsion is prepared by adding per liter emulsion 20 mg. of any one of the red sensitizers prepared according to Examples 6, 7, 9, 10, 22 or 23, and to such red sensitive emulsion as a dye-forming substance either a cyan color developing coupler or an azo coupler is added in a quantity of 0.3–2 grams per liter. As a color developing coupler: 1-hydroxy-4-sulfo-2-stearyl - naphthamide, or 5-(para-amyl-phenoxy-benzenesulfonamino)-1-naphthol, or as an azo coupler the compound described in Example 3 of U.S. Patent 2,653,874 is used. Said last mentioned compound is naphthalene-1,5-di-(sulfonaphthionyl-1',5'-aminonaphthol.

(36–b) A green sensitive emulsion is prepared by adding per liter emulsion 10–20 mg. of one of the green sensitizers prepared according to Example 16 or 17. To such green sensitive emulsion either a magenta color developing coupler or an azo coupler is added in a quantity of 0.3–2 grams per liter. As a color developing coupler 3-heptadecyl-1-para-sulfophenyl-5-pyrazolone, or as an azo coupler the compound described in Example 3 of U.S. Patent 2,653,874 is used. Said last mentioned compound is the n-amyl ether of n-(N,N-diethylamino)-phenol.

(36–c) A blue sensitive emulsion containing the yellow dye-forming substance is prepared which contains a yellow dye-forming substance 0.3–2 grams per liter emulsion. As color developing coupler 4-methyl-octadecylamino-(benzolyacetamino)-3-benzoic acid or as an azo coupler N,N'-decamethylene - bis(2,4-dioxo-1,2,3,4-tetrahydroquinoline is used.

The three emulsions, (a), (b), and (c) are coated on top of each other in a manner well known in the art,

20 using the customary quantity of hardener and spreading agents and using between the blue and green sensitive layer a filter layer, or using the silver chloride layer arrangements as set forth in my U.S. Patent 2,344,084. This arrangement makes it unnecessary to coat a separate yellow filter layer and also permits altering of the sequence of the color sensitive layers. By using the novel sensitizers in the material containing color formers, emulsion layers of high and selectivecolor sensitivity, of good keeping quality, are obtained, and the sensitizers leave no residual stain after the usual processing.

Example 37

5[5 - (3 - ethyl-2-thiono-4-oxo-thiazolidine-5-yl-methylene) - 3 - ethyl - 4 - oxo-thiazolidine-2-ylidene]-3-ethyl-2-thiono-4-oxo-thiazolidine.

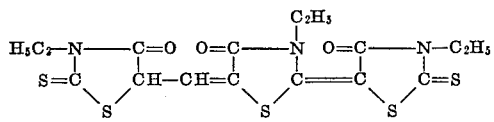

This dye is produced by reacting 0.01 mol of intermediate 1–a, and 0.02 mol of 3-ethyl-rhodanine in a manner similar to the reaction carried out in Example 2. The dye is isolated in the usual way. The dye so produced has sensitizing and absorption characteristics similar to the dye of Example 2, i.e., it sensitizes and absorbs in the same spectral region as the dye of Example 2.

Example 38

Alternative procedure for preparation of intermediate 1–$b_2$, through monoalkylation of bis[3-ethylrhodanine-(5)]-methinoxonol: .332 gram (.001 mol) bis [3-ethyl-rhodamine-(5)]-methinoxonol and .126 gram (.001 mol) dimethylsulfate and 1 cc. normal sodium hydroxide solution was added, and the mixture to reflux for 20 minutes to about 30° C. and then finally to reflux for a further 5 minutes. On cooling, the intermediate 1–$b_2$ separates in crystalline form, which is washed with ice-cold methanol. The yield is in excess of 30% of theory.

While I have disclosed various modifications of the invention for purposes of illustration, it is understood that the invention is not to be taken as limited, except by the scope of the appended claims.

I claim:
1. A dye having the general formula

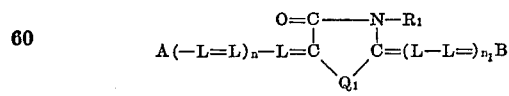

where $n$ and $n_1$ are each a positive integer of from 0 to 2. A is a member of the class consisting of

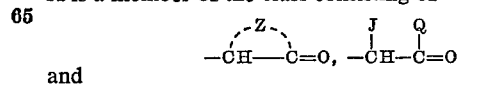

and

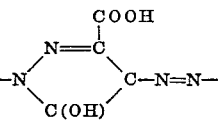

groups, B is a member of the class consisting of

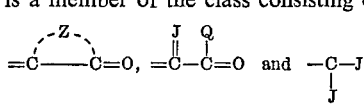

groups, where J is a member of the group consisting of cyano, carboxyl, acetyl, propionyl and benzoyl radicals, Q is a member of the group consisting of hydroxyl, alkyl, aryl, amino, carbalkoxyl, alkoxyl, furane and thiophene radicals, and Z represents the non-metallic atoms necessary to complete a number of the group consisting of thiazolidone, oxazolidone, imidazolidone, thionaphthenone, pyrazolone and pyrimidone nuclei and of carbocyclic nuclei, L is a methine group, $R_1$ is a member of the group consisting of alkyl, aryl, pyridyl, thiazolyl, benzoyl and

radicals, where $R_3$ is a member of the group consisting of hydrogen, alkyl, aryl and acyl groups, and $R_4$ is acyl, and $Q_1$ is a member of the class consisting of S and

radicals, where $R_2$ is a member of the group consisting of hydrogen, ethyl and phenyl radicals.

2. A dye having the general formula

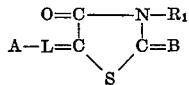

where A is a member of the class consisting of

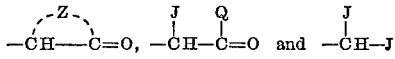

groups, B is a member of the class consisting of

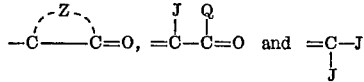

groups, where J is a member of the group consisting of cyano, carboxyl, acetyl, propionyl and benzoyl radicals, Q is a member of the group consisting of hydroxyl, alkyl, aryl, amino, carbalkoxy, alkoxy, furane and thiophene radicals, and Z represents the non-metallic atoms necessary to complete a member of the group consisting of thiazolidone, oxazolidone, imidazolidone, thionaphthenone, pyrazolone and pyrimidone nuclei and of carbocyclic nuclei, L is a methine group, and $R_1$ is a member of the group consisting of alkyl, aryl, pyridyl, thiazolyl, benzoyl

radicals, where $R_3$ is a member of the group consisting of hydrogen, alkyl, aryl and acyl groups and $R_4$ is acyl.

3. A dye having the formula

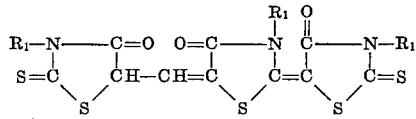

where $R_1$ is a member of the group consisting of alkyl, aryl, pyridyl, thiazolyl, acyl and

radicals, where $R_3$ is a member of the group consisting of hydrogen, alkyl, aryl and acyl groups, and $R_4$ is acyl.

4. A dye intermediate having the general formula

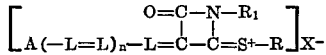

where $n$ is a positive integer of from 0 to 2. A is a member of the class consisting of

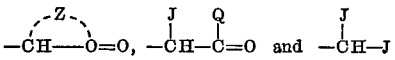

groups, Bis a member of the class consisting of

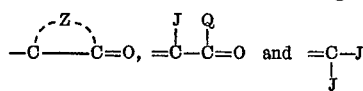

groups, where J is a member of the group consisting of cyano, carboxyl, acetyl, propionyl and benzoyl radicals, Q is a member of the group consisting of hydroxyl, alkyl, aryl, amino, carbalkoxyl, alkoxyl, furane and thiophene radicals, and Z represents the non-metallic atoms necessary to complete a member of the group consisting of thiazolidone, oxazolidone, imidazolidone, thionaphthenone, pyrazolone and pyrimidone nuclei and of carbo cyclic nuclei, L is a methine group $R_1$ is a member of the group consisting of alkyl, aryl, pyridyl, thiazolyl, benzoyl and

radicals, where $R_3$ is a member of the group consisting of hydrogen, alkyl, aryl and acyl groups, and $R_4$ is acyl, and $Q_1$ is a member of the class consisting of S and

radicals, where $R_2$ is a member of the group consisting of hydrogen, ethyl and phenyl radicals, R is alkyl, and X is an anion.

5. A dye intermediate as defined in claim 4, wherein $n$ is O, and $Q_1$ is S.

6. A dye intermediate of the general formula

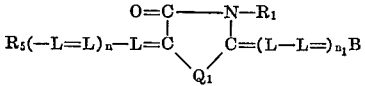

member of the class consisting of

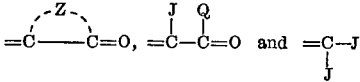

groups, where J is a member of the group consisting of cyano, carboxyl, acetyl, propionyl and benzoyl radicals, Q is a member of the group consisting of hydroxyl, alkyl, aryl, amino, carbalkoxyl, alkoxyl, furane and thiophene radicals, and Z represents the non-metallic atoms necessary to complete a member of the group consisting of thiazolidone, oxazolidone, imidazolidone, thionaphthenone, pyrazolone and pyrimidone nuclei and of carbocyclic nuclei, L is a methine group, $R_1$ is a member of the group consisting of alkyl, aryl, pyridyl, thiazolyl, benzoyl and

radicals, where $R_3$ is a member of the group consisting of hydrogen, alkyl, aryl and acyl groups, and $R_4$ is acyl, and $Q_1$ is a member of the class consisting of S and

radicals, where $R_2$ is a member of the group consisting of hydrogen, ethyl and phenyl radicals, and $R_5$ is a member of the group consisting of phenylamino and acetanilido.

7. A dye intermediate as defined in claim 6, where $n$ and $n_1$ are each 0, and $Q_1$ is S.

8. A dye intermediate of the general formula

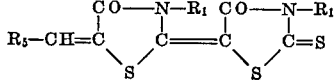

where $R_5$ is a member of the group consisting of arylamino and acylarylamino, and $R_1$ is a member of the group consisting of alkyl, aryl, pyridyl, thiazoyl, benzoyl and

radicals, where $R_3$ is a member of the group consisting of hydrogen, alkyl, aryl and acyl groups, and $R_4$ is acyl.

9. A dye intermediate of the general formula

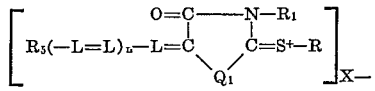

where $n$ is a positive integer of from 0 to 2, $R_1$ is a member of the group consisting of alkyl, aryl, pyridyl, thiazolyl, benzoyl and

radicals, where $R_3$ is a member of the group consisting of hydrogen, alkyl, aryl and acyl groups, and $R_4$ is acyl, and $Q_1$ is a member of the class consisting of S and

radicals, where $R_2$ is a member of the group consisting of hydrogen, ethyl and phenyl radicals, R is alkyl, and X is an anion, and $R_5$ is a member of the group consisting of phenylamino and acetanilido.

10. A dye intermediate as defined in claim 9; wherein $n$ is 0, and $Q_1$ is S.

11. A process for preparing a dye which comprises interacting in a solvent under basic conditions a compound of the group consisting of those having the general formulae (a)
(b)
(c)

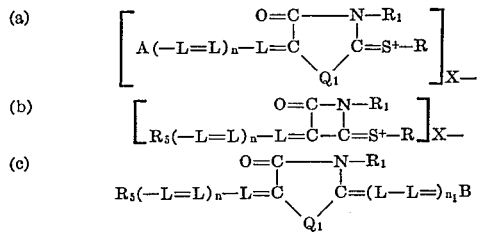

with a compound of the class consisting of those having the formulae:

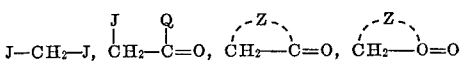

and

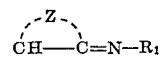

where $n$ and $n_1$ are each a positive integer of from 0 to 2, A is a member of the class consisting of

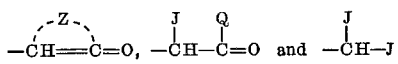

groups, B is a member of the class consisting of

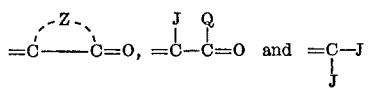

groups, where J is a member of the group consisting of cyano, carboxyl, acetyl, propionyl and benzoyl radicals, Q is a member of the group consisting of hydroxyl, alkyl, aryl, amino, carbalkoxyl, alkoxyl, furane and thiophene radicals, and Z represents the non-metallic atoms necessary to complete a member of the group consisting of thiazolidone, oxazolidone, imidazolidone, thionaphthenone, pyrazolone and pyrimidone nuclei and of carbocyclic nuclei, L is a methine group, $R_1$ is a member of the group consisting of alkyl, aryl, pyridyl, thiazolyl, benzoyl, and

radicals, where $R_3$ is a member of the group consisting of hydrogen, alkyl, aryl and acyl groups, and $R_4$ is acyl, and $Q_1$ is a member of the class consisting of S and

radicals, where $R_2$ is a member of the group consisting of hydrogen, ethyl and phenyl radicals, R is alkyl, X is an anion and $R_5$ is a member of the group consisting of phenylamino and acetanilido radicals.

12. A process as defined in claim 11, wherein said first mentioned compound has the general formula designated $(a)$.

13. A process as defined in claim 12, wherein $n$ is 0, and $Q_1$ is S.

14. A process as defined in claim 13, wherein said second mentioned compound has the general formula

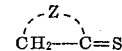

15. A process as defined in claim 11, wherein said first mentioned compound has the general formula designated $(b)$.

16. A process as defined in claim 11, wherein said first mentioned compound has the formula designed $(c)$.

17. A process for preparing a dye which comprises interacting in a solvent under basic conditions a compound of the general formula

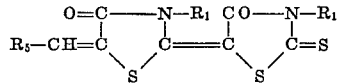

with a compound of the class consisting of those having the formulae

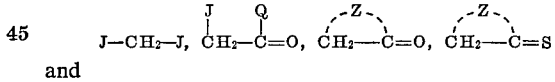

and

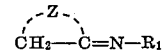

where J is a member of the group consisting of cyano, carboxyl, acetyl, propionyl and benzoyl radicals. Q is a member of the group consisting of hydroxyl, alkyl, aryl, amino, carbalkoxyl, alkoxyl, furane and thiophene radicals, and Z represents the non-metallic atoms necessary to complete a member of the group consisting of thiazolidone, oxazolidone, imidazolidone, thionaphthenone, pyrazolone and pyrimidone nuclei and of carbocyclic nuclei; $R_1$ is a member of the group consisting of alkyl, aryl, pyridyl, thiazolyl, benzoyl and

radicals, where $R_3$ is a member of theg roup consisting of hydrogen, alkyl, aryl, and acyl groups, and $R_4$ is acyl, and $R_5$ is a member of the group consisting of phenylamino and acetanilido radicals.

18. A dye as defined in claim 3, wherein $R_1$ is alkyl.

19. A dye having the general formula

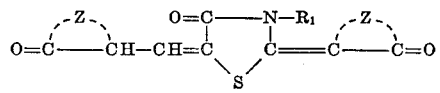

where Z represents the non-metallic atoms necessary to complete a member of the group consisting of thiazolidone, oxazolidone, imidazolidone, thionaphthenone, pyrazolone and pyrimidone nuclei, and $R_1$ is a member of the group consisting of alkyl, aryl, pyridyl, thiazolyl benzoyl and

radicals, where $R_3$ is a member of the group consisting of hydrogen, alkyl, aryl, and acyl groups, and $R_4$ is acyl.

References Cited

UNITED STATES PATENTS

| 2,713,579 | 7/1955 | Knott | 260—240.1 |
| 3,152,905 | 10/1964 | Gaspar | 260—240.1 |

OTHER REFERENCES

Knott, J. Chem. Soc. 1954, pages 1482 to 1489. QD1C6.

JOHN D. RANDOLPH, *Primary Examiner.*

U.S. Cl. X.R.

96—84, 106; 260—240.2, 306.7, 37, 304, 309.7, 251, 310; 8—4